United States Patent
Barclay et al.

[11] Patent Number: 5,854,553
[45] Date of Patent: Dec. 29, 1998

[54] DIGITALLY LINEARIZING EDDY CURRENT PROBE

[75] Inventors: John T. Barclay, Carlsbad; Phillip L. Maness, El Cajon; Leroy R. Bannach, San Diego, all of Calif.

[73] Assignee: SKF Condition Monitoring, San Diego, Calif.

[21] Appl. No.: 666,860

[22] Filed: Jun. 19, 1996

Related U.S. Application Data

[60] Provisional application No. 60/008,211 Dec. 5, 1995.

[51] Int. Cl.⁶ .................... G01G 7/14; G01R 33/12
[52] U.S. Cl. .................. 324/207.16; 324/207.12; 324/207.26; 702/38
[58] Field of Search ............ 324/207.11, 207.12, 324/207.15, 207.16, 207.17, 222, 228, 230, 229, 236–243, 226, 207.26; 702/34, 38, 151, 142, 145, 150

[56] References Cited

U.S. PATENT DOCUMENTS

| | | | |
|---|---|---|---|
| 3,609,580 | 9/1971 | Thompson | 324/207.16 |
| 3,851,242 | 11/1974 | Ellis | 324/236 |
| 4,042,876 | 8/1977 | Visioli, Jr. | 324/207.15 |
| 4,059,794 | 11/1977 | Furness et al. | 324/227 |
| 4,160,204 | 7/1979 | Holmgren et al. | 324/207.16 |
| 4,414,508 | 11/1983 | Davis et al. | 324/238 |
| 4,450,405 | 5/1984 | Howard | 324/234 |
| 4,580,097 | 4/1986 | Bartlett | 324/234 |
| 4,598,260 | 7/1986 | Carr | 324/222 |
| 4,659,988 | 4/1987 | Goff et al. | 324/207.25 |
| 4,841,245 | 6/1989 | Fiori, Jr. | 324/207.17 |
| 4,847,556 | 7/1989 | Langley | 324/207.18 |
| 4,851,770 | 7/1989 | Fiori, Jr. | 324/207.16 |
| 4,875,007 | 10/1989 | Ginns | 324/207.12 |
| 4,952,891 | 8/1990 | Moulding | 333/17.1 |
| 5,144,231 | 9/1992 | Tenenbaum et al. | 324/164 |
| 5,180,978 | 1/1993 | Postma et al. | 324/207.16 |
| 5,198,764 | 3/1993 | Spencer | 324/207.16 |
| 5,365,787 | 11/1994 | Hernandez et al. | 324/207.25 |
| 5,420,507 | 5/1995 | Laskowski | 324/236 |
| 5,459,405 | 10/1995 | Wolff et al. | 324/632 |

FOREIGN PATENT DOCUMENTS

| | | |
|---|---|---|
| 0136238 B1 | of 0000 | European Pat. Off. . |
| 0631147 A1 | 12/1994 | European Pat. Off. . |
| 2112944 | 7/1983 | Guadeloupe . |
| 2054867 | 2/1981 | United Kingdom . |

*Primary Examiner*—Jay M. Patidar
*Attorney, Agent, or Firm*—Knobbe, Martens, Olson & Barr, LLP

[57] ABSTRACT

The output of an eddy current probe is demodulated and subsequently linearized using an analog to digital converter, a digital signal processor, and a memory. The linearized digital output signal is converted back to an analog signal, the voltage of which is preferably directly proportional to the position of the conductive target in relation to the probe.

20 Claims, 8 Drawing Sheets

DIGITALLY LINEARIZING EDDY CURRENT PROBE

RELATED APPLICATIONS

This application claims priority under 35 U.S.C. §119 to U.S. patent application Ser. No. 60/008,211, filed Dec. 5, 1995.

BACKGROUND OF THE INVENTION

1. Field of the Invention

The present invention relates to electronic position measuring devices, and more particularly, to eddy current probes for measuring the position of a conductive target relative to the probe surface.

2. Description of the Related Technology

Rotating machinery such as motors, generators, and turbines find widespread application in areas such as manufacturing, power generation, materials processing, as well as many others. Over time, such machinery is subject to wear and potential failure. Given the high operating RPM and high power dissipation of many industrial applications of such machinery, failure during operation may have severe consequences in terms of damage to the failed equipment itself as well as neighboring equipment and areas of the installation. In addition, preventive machinery shut downs for maintenance and repair can be very costly in terms of facility downtime and direct expense in labor and replacement parts. Accordingly, it has become important in this area to provide monitoring equipment associated with such rotating machinery to provide indications of its condition. Preferably, such .condition monitoring equipment can indicate when a piece of machinery is excessively worn or is otherwise operating improperly. In these instances, the affected machinery can be shut down and repaired prior to a catastrophic failure. Furthermore, such monitoring equipment can indicate when machinery is operating within a defined normal operating range, thereby eliminating unnecessary shutdowns for preventive maintenance. It can be appreciated that condition monitoring equipment employed for these purposes should quickly detect and either flag or shut down equipment subject to imminent failure, but should not unnecessarily flag or shut down properly functioning equipment.

Some condition monitoring systems utilize eddy current proximity probes. Eddy current probes are well known for their ability to detect the position or condition of varying types of conductive materials. These probes are useful in a variety of related applications including position measurement (such as axial and radial runout or displacement of a rotating assembly) and defect or flaw detection in metallic objects. For example, eddy probe systems are commonly used to detect the lateral position of a rotating shaft in relation to its journal bearing by mounting one or more probes within the bearing in close proximity to the shaft.

Eddy current probes comprise an inductor, or coil, situated at the probe tip driven with a radio frequency (RF) signal which in turn creates a varying magnetic field in any adjacent conductive target material. This magnetic field produces eddy currents in the material that induce a counter-electromotive force (emf) in the eddy probe inductor, thereby altering the effective impedance of the inductor. The impedance of the probe therefore provides an indication of the distance between the target and the probe.

Conventionally, the RF oscillator which drives the eddy current probe circuit is an analog transistor-based oscillator such as the Colpitts oscillator. A Colpitts oscillator utilizes a transistor in conjunction with an LC tank circuit wherein the eddy current probe coil functions as the inductive element of the tank circuit. A portion of the current flowing in the tank circuit is fed back to the base of the oscillator transistor. Varying the distance of the conductive target element from the coil varies the impedance of the detector coil and thereby varies the output frequency and voltage of the oscillator.

The above described system has several drawbacks. First, the impedance of the probe coil is not linearly related to the distance between the coil and the target surface. This is inconvenient for automated target monitoring because depending on the region of the impedance vs. distance curve the system is operating at, small changes in impedance may indicate much larger changes in distance, or alternatively, large impedance changes may indicate small distance changes.

Of course, even when the impedance is a non-linear function of target position, reference to a calibration curve can uniquely identify a position corresponding to a given measured impedance. Accordingly, some systems, such as the one described in published European Patent Application No. 84401906.7 to Clergeot et al., calculate position by digitally referencing measured eddy current probe outputs to a stored calibration curve. Other systems for measuring the conductivity (rather than proximity) of a target sample are described in U.S. Pat. No. 4,450,405 to Howard, and published European Patent Application No. 94630039.9 to Prometrix Corporation. A similar system for measuring the thickness of a non-conductive coating on a conductive target is disclosed in published U.K. Patent Application No. GB 2,112,944 A to Taylor.

However, rather than compute target position directly from impedance measurements, it is common in the condition monitoring industry to transform the non-linear impedance measurements into a second analog signal, such as 0 to −24 Vdc or 4 to 20 mA, which is linear with target distance. This analog output is routed to host monitoring equipment which comprises alarms, circuit breakers, etc. These devices are set to trip when the linear analog output is outside a nominal operating range set by the plant operators. The transformation of the eddy current probe output into a linear analog signal suitable for host monitoring equipment has been typically accomplished in two stages. First, the oscillator input to the probe is conditioned by carefully biasing the transistor(s) used in the RF oscillator to take advantage of the non-linear transistor gain curve. This corrects for some of the output non-linearities. Second, a variable gain analog amplifier is provided on the probe output to compensate for the remaining non-linearities. This requires a complex circuit which is difficult to manufacture and tune, and has an accuracy which is difficult to maintain. Furthermore, individual eddy current probe and cable configurations and target materials require individual tuning of one or both of the oscillator circuit biasing and the variable gain amplifier.

Another drawback of a Colpitts oscillator based eddy current probe is that temperature-induced variations in the PN junction of the oscillator transistor make the circuit sensitive to ambient temperature changes. Compensation for this effect can be accomplished, but it requires the careful selection of additional circuit components to properly match the gain and temperature coefficients, further increasing the complexity of the oscillator circuit.

Another potential problem with use of Colpitts circuits for eddy current probe applications relates to the range of the eddy current probe impedance the oscillator is required to drive. As the conductive target approaches the probe coil, the impedance of the coil decreases at roughly a logarithmic rate. In many cases, depending on how the elements of the oscillator circuit are chosen, the oscillator will cease to function if the impedance reaches too low a value, thus effectively limiting the useful range of the measurement device in terms of target displacement. This problem is addressed in U.S. Pat. No. 3,609,580 to Thompson, et al., which discloses an eddy probe oscillator circuit which continues to oscillate under very low "Q" conditions. However, such a design requires a more complicated oscillator circuit which is more expensive to manufacture and operate.

It would therefore be highly desirable to provide an improved oscillator circuit which would be simple, reliable, and not be substantially affected by temperature variations or changes in equipment configuration. Furthermore, it would be highly desirable to provide an improved linearization circuit for transforming the eddy current output into an analog signal suitable for host monitoring equipment. Such an improved linearization circuit would preferably eliminate the need for circuit modification due to equipment configuration changes and also preferably reduce the level of effort and increase the precision associated with system recalibration for different probe geometries and target materials.

SUMMARY OF THE INVENTION

The present invention provides an improved configuration for an eddy current proximity probe driver circuit. In one aspect of the present invention, an oscillator circuit comprises a phase locked loop to maintain resonance of an eddy current probe with varying equipment configurations, conductive target materials, and target displacements. Such a circuit overcomes many drawbacks associated with the prior art, and provides improved performance over a wider temperature range, inexpensive manufacture, and increases the range of probe impedances suitable for a single driver circuit configuration. Resonance may be maintained either by altering the frequency of the signal driving the eddy current probe, or by altering the resonant circuit being driven.

In a further aspect, a digital linearization circuit is disclosed in which the analog signal from the eddy current probe is converted to digital format and arithmetically processed to provide an output signal with functional dependence different from that of the analog input signal. This digital linearization is much simpler than the piecewise analog linearization performed in the prior art.

More specifically, the invention comprises a method for monitoring the condition of a piece of machinery comprising an electrically conductive surface comprising first placing an eddy current probe in proximity to the conductive surface and driving the eddy current probe with a square wave signal produced by a driver circuit. The driver circuit defines an oscillation frequency, and the combination of the driver circuit and the eddy current probe define a resonant frequency. In response to changes in distance between the eddy current probe and the electrically conductive surface, the driver circuit is altered so as to maintain a constant relationship between the oscillation frequency defined by the driver circuit and the resonant frequency defined by the eddy current probe and the driver circuit.

The invention also comprises a monitoring apparatus which includes an eddy current probe, a variable frequency oscillator having an output coupled to an input of the eddy current probe, and a phase detector circuit coupled to both the eddy current probe and the variable frequency oscillator. In this aspect, the oscillation frequency of the variable frequency oscillator is varied in response to an output of said phase detector.

In another aspect of the present invention, a monitoring apparatus includes an eddy current probe, a fixed frequency oscillator, a variable capacitor, and a phase detector circuit coupled to the eddy current probe, the output of the fixed frequency oscillator, and the variable capacitor. In this aspect, the capacitance of the variable capacitor is varied in response to the output of the phase detector.

Furthermore, another aspect of the present invention includes a method for monitoring the condition of a piece of machinery comprising an electrically conductive surface, wherein the method comprises the steps of placing an eddy current probe in proximity to the conductive surface, wherein the eddy current probe has an output comprising a first signal indicative of the position of the conductive surface. Digitally translating this first signal from a non-linear functional domain into a second signal in a linear functional domain, and measuring the position of the conductive surface as a function of the second signal.

DETAILED DESCRIPTION OF THE PREFERRED EMBODIMENTS

Preferred embodiments of the present invention will now be described with reference to the accompanying figures, wherein like numerals refer to like elements throughout.

Figure 1A:
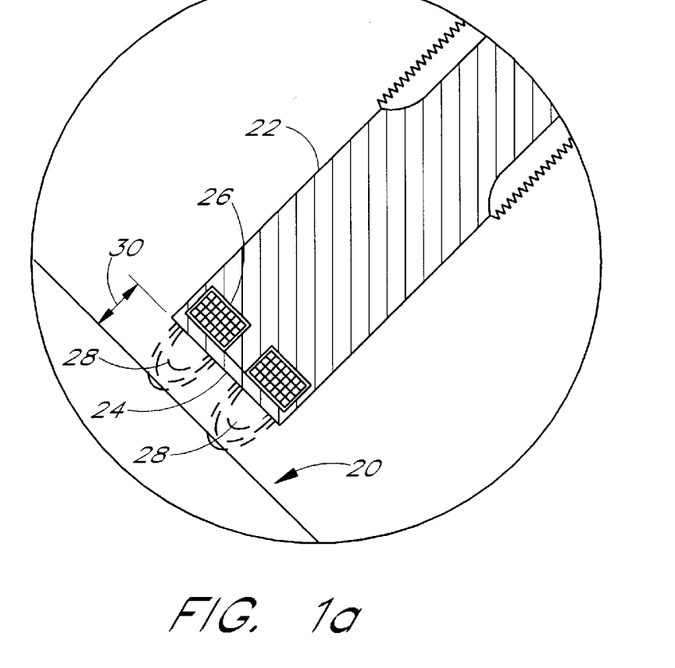
FIG. 1a is a cutaway view of an eddy current probe of the present invention adjacent to a conductive target material.

The principles of eddy current probe displacement monitoring is illustrated in FIG. 1a. This Figure shows a cross sectional view of a target surface 20 adjacent to one end of an eddy current probe 22. At one end 24 of the probe 22 is a coil 26, preferably wound in a flat "pancake" configuration near the probe tip 24. When this coil 26 carries a radio frequency (RF) current, an electromagnetic field 28 penetrates the target surface 20. When the target 20 is conductive, this electromagnetic field induces eddy currents in the target material. These currents produce an additional electromagnetic field which affects the impedance of the coil 26. The magnitude of the eddy currents is dependent on the gap 30 between the probe tip 24 and the target surface 20, and therefore the impedance of the coil 26 is also dependent on the same gap. Measurements of the coil impedance (or, preferably, other parameters affected by coil impedance as explained more fully below) may therefore be utilized to determine the distance of the gap 30. It may be noted that the target need not be magnetic, such as steel or another iron based material, for eddy current impedance changes to occur. However, the magnetic properties of the target do play a substantial role in probe response to gap distance.

Figure 1B:
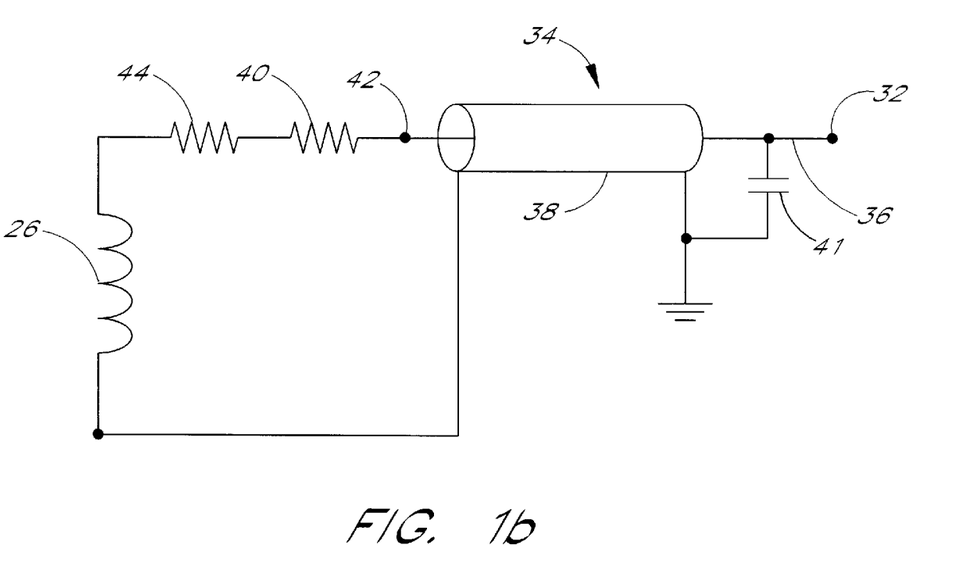
FIG. 1b is a schematic of an equivalent circuit for an eddy probe as shown in FIG. 1a and its associated cable.

Referring now to FIG. 1b, the RF signal input to the probe runs from an input node 32 through a coaxial cable 34 which comprises an inner conductor 36 and surrounding grounded shield 38. The cable 34 runs between the probe assembly 22 and RF driver and sensing apparatus which is typically 5 to 15 meters away. This coaxial cable 34 includes an inherent resistance, illustrated in FIG. 1b as a series resistor 40, as well as an inherent capacitance 41 between the shield 38 and the inner conductor 36. The output of this cable 34, is then connected to the input node 42 of the probe assembly 22. The probe coil 26 additionally includes an inherent DC series resistance 44. After passing through the coil 26, the signal is routed out of the probe assembly 22, and back to the grounded shield 38 of the coaxial conductor 34. An eddy current probe apparatus therefore forms a resonant circuit comprising the probe coil 26 with its inherent DC resistance 44, and the capacitance of the coaxial cable 34 feeding the RF signal to the probe assembly 22.

When such a resonant circuit is driven at its resonant frequency the load impedance of the circuit is purely resistive and is given by the following equation, where R is the combined DC resistance of the coil 26 and the cable 34, L is the inductance of the coil 26, and C is the cable capacitance 41:

$$R_E = \frac{L}{RC}.$$

Although numerical values for these parameters may vary widely depending on the application of the probe system, typical values are a coil inductance of 10 to 60 microhenrys, most typically 25 to 35 microhenrys, a coil DC resistance of 1 to 5 ohms, most typically 2–3 ohms, and a cable capacitance of 30 to 80 picofarads per meter of cable, most typically 55 to 65 picofarads per meter of cable. Resonant frequencies are generally 500 kHz to 5 or 10 MHz, most typically 1 to 2 MHz. Resistance values $R_E$ at resonance (determined by the equation above) are typically in the 1 to 10 kilo-ohm range, most typically in the 3–7 kilo-ohm range.

Figure 2:
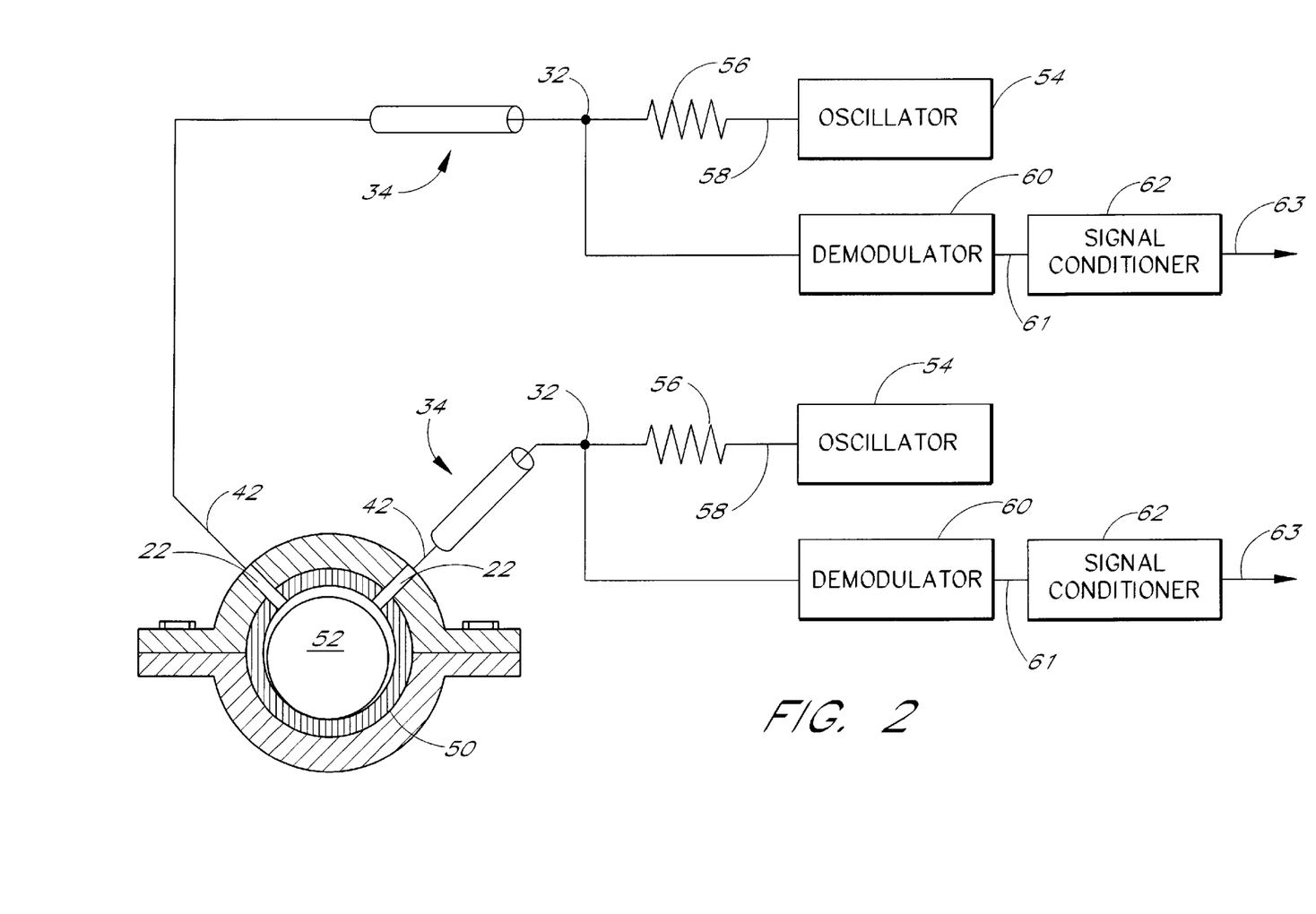
FIG. 2 is a cutaway view of a bearing and a block diagram of a shaft displacement measurement system comprising eddy current probes.

FIG. 2 illustrates a representative application of eddy current probes for monitoring a rotating shaft mounted in a sleeve bearing. Two eddy current probe bodies 22 are threaded into tapped holes in a sleeve bearing 50. The rotating shaft 52 rides somewhat unevenly within the bearing 50, periodically traveling closer to and farther from the ends 24 of the probe bodies 22. As discussed above, these variations in gap width 30 between the probe tip 24 (FIG. 1a) and the surface of the shaft 52 produce changes in the impedance of the probe.

As described above with reference to FIG. 1b, each probe 22 is connected at an input node 42 to one end of a coaxial cable 34 to driver and sensing circuitry. An RF signal is applied to the input node of the cable 34 by an oscillator circuit 54 through a fixed value resistor 56. It can be appreciated that when the frequency of the RF signal generated by the oscillator 54 coincides with the resonant frequency of the probe/cable apparatus, the output voltage of the oscillator at node 58 is dropped across two resistors in series, the fixed resistor 56, and the purely resistive load impedance of the probe/cable apparatus. Eddy current induced changes in probe/cable load impedance relative to the resistance of the fixed resistor 56 therefore appear as changes in the voltage measured at node 32 between the fixed resistor 56 and the probe impedance.

In one preferred embodiment of the present invention, described herein in detail with reference to FIGS. 3 through 6, the oscillator drives the probe/cable system at resonance, and the potential of node 32 is monitored as the resistive load impedance of the probe cable system varies relative to the fixed resistance 56.

Figure 3:
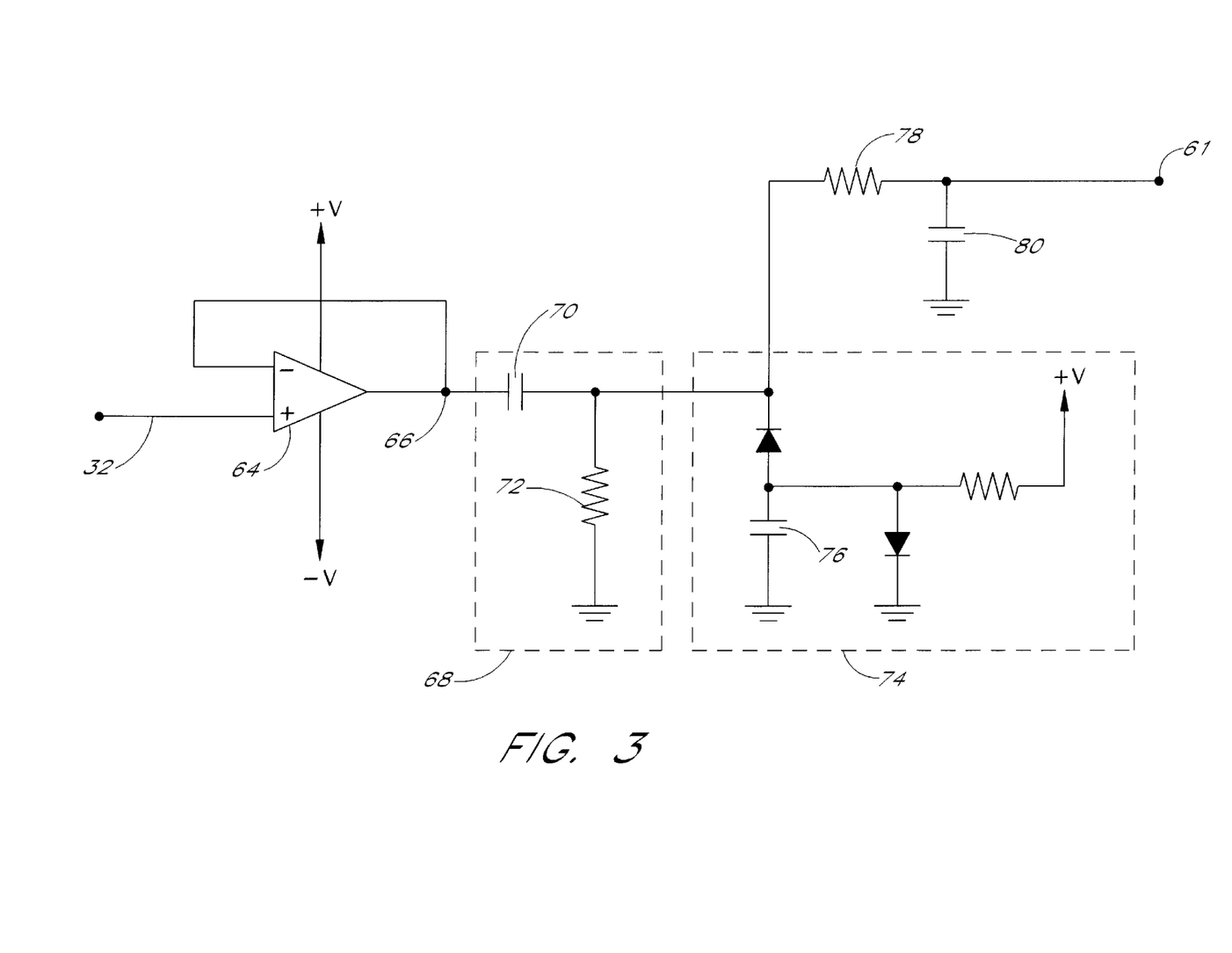
FIG. 3 is a schematic diagram of a preferred demodulator of FIG. 2 for demodulating the eddy probe output signal.

As the resistor 56 and the resistive probe impedance form a simple voltage divider, only the peak amplitude of the AC radio frequency signal at node 32 is of interest. It is this peak amplitude that varies as the probe/cable impedance varies. The high frequency (i.e. 1 MHz or higher) AC signal must therefore be demodulated into a varying DC signal which fluctuates in value as the target to probe distance fluctuates. This function is performed by a demodulator circuit 60, which can take numerous different forms. Perhaps the simplest is an RC type peak detector well known in the art, which can be implemented in many different ways, one of which is illustrated in FIG. 3. Following demodulation, the signal is conditioned with a signal conditioning circuit 62 which is described in more detail below with reference to FIGS. 7 and 8.

Referring now to FIG. 3, in one preferred demodulation circuit the signal at node 32 is input to an operational amplifier 64 configured as a follower to create a high input impedance and low output impedance with no signal gain. A wide variety of commercially available operational amplifiers are suitable. The output signal of this buffer at node 66 is input to a DC blocking high pass filter 68 comprising a series capacitor 70 and shunt resistor 72 with an RC time constant of preferably about 50 to 150 microseconds (which is much longer than the typically 1 to 5 microsecond wavelength of the oscillator waveform). The signal is then input to an absolute value circuit 74 which charges the filter capacitor 70 until the high frequency AC signal appearing at the output of the high pass filter circuit 68 is biased to be entirely above ground. Preferably, the filter capacitor 76 of the absolute value circuit 74 is much larger than the high pass filter capacitor 70. Values of 0.1 microfarad and 1000 picofarad respectively have been found suitable. Finally, the signal is low pass filtered with a series resistor 78 and shunt capacitor 80 with a time constant of 50 to 150 microseconds to produce a slowly varying DC output signal representative of the varying peak value of the AC voltage at node 32. This demodulator 60 output signal at node 61 is not linearly proportional to the distance between the probe 22 tip and the target surface 20. Due to eddy current effects, the effective resistance $R_E$ of the probe coil 26 increases with increasing distance between the probe tip and the target, and therefore the amplitude of the voltage at node 32 increases with increasing probe-target distance as well. When the amplitude of the oscillator 54 output at node 58 is constant, the voltage at node 32 varies roughly as the log of the probe-target distance, although the exact functional dependence varies with the details of probe construction and target material and configuration. In a preferred embodiment, the non-linear characteristics of this output signal are removed by a signal conditioner 62 (FIG. 2), which outputs a second signal at node 63 which preferably has a substantially linear functional dependence on the probe-target distance. This feature of the present invention is described in more detail below with reference to FIGS. 7 and 8.

Figure 4:
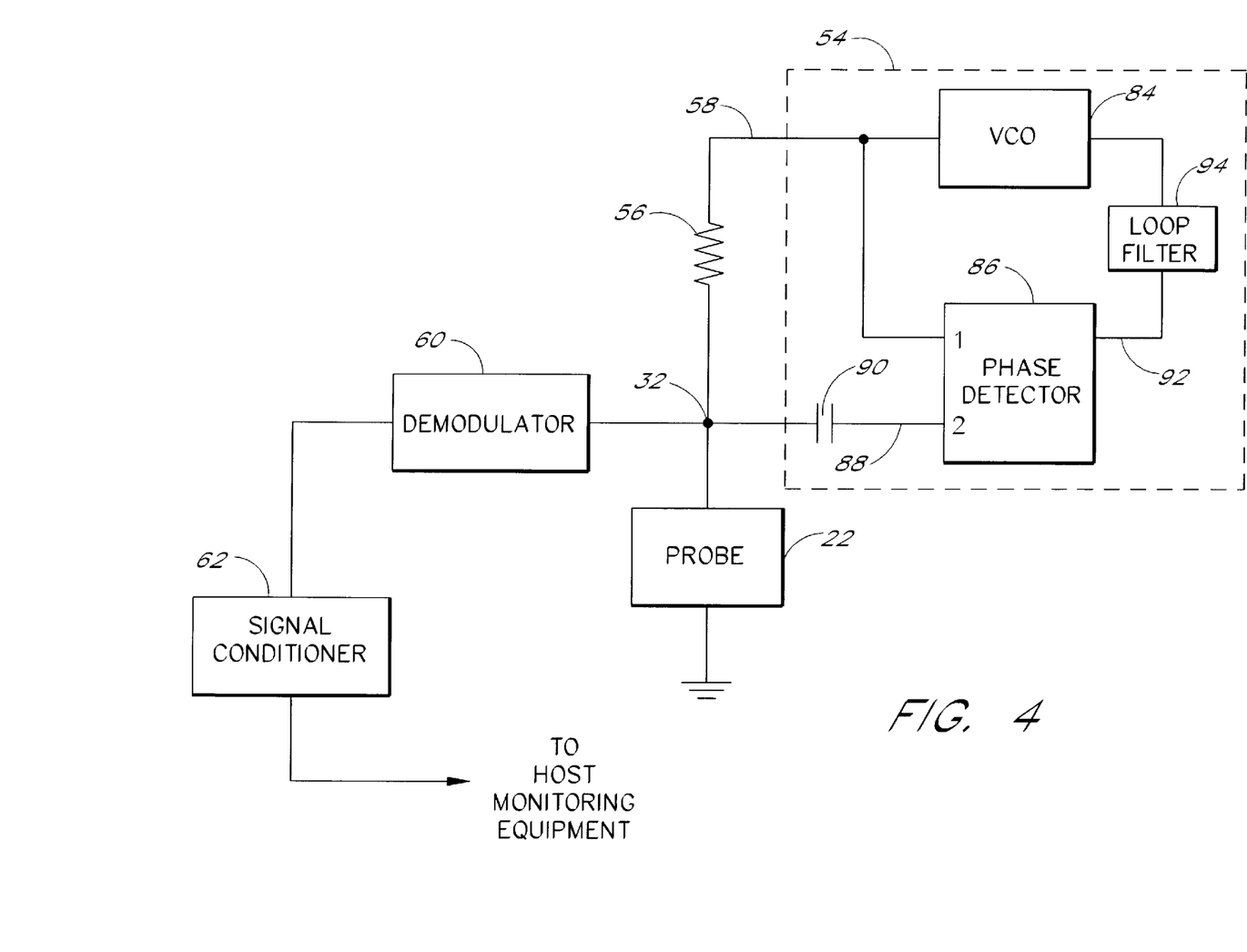
FIG. 4 is a block diagram of a first embodiment of a preferred eddy probe oscillator circuit of FIG. 2 according to the present invention.

Referring now to FIG. 4, a schematic/block diagram representation of a first embodiment of a preferred eddy current probe oscillator 54 circuit is shown. In this circuit, a voltage controlled oscillator (VCO) 84 provides an RF square wave signal with a peak amplitude of approximately 5 Vdc at its output node 58 which is connected to one side of the series fixed resistor 56, having a resistance on the same order as the resonant impedance of the probe assembly, for example, approximately 5 kohms. The VCO 84 output at node 58 is further connected to one input of a phase detector 86. A second input to the phase detector 86 at node 88 is coupled to the opposite side of the series fixed resistor 56 through a DC blocking capacitor 90. The output of the phase detector 86 at node 92 further provides an input to a series loop filter 94, which outputs a filtered phase detector signal to the VCO 84 to control the VCO 84 output signal frequency at node 58. The loop filter 94 is preferably a low pass RC filter, most preferably having a time constant of approximately 150 microseconds.

It will be appreciated by those of skill in the art that the phase detector 86, loop filter 94, and voltage controlled oscillator 84 comprise a phase-locked-loop circuit which will maintain a substantially constant phase and frequency relationship between the VCO output voltage (referenced to ground or common) at node 58 and the voltage (again referenced to ground or common) at node 32 on the opposite side of the fixed resistor 56. If the impedance of the probe is purely resistive, as is the case when the circuit is being driven at its resonant frequency, the voltage across the probe 22 will be in phase with the voltage output from the VCO at node 58. Most preferably, therefore, the phase detector 86 and voltage controlled oscillator are designed to maintain such an in-phase relationship between the voltage across the probe 22 at node 32 and the VCO 84 output at node 58. When so designed, the probe will continue to be driven at its resonant frequency even as that frequency is shifted by changes in probe-target separation.

Implementation of a preferred driver circuit as shown in FIG. 4 is simplest when the VCO 84 supplies a square wave voltage output at node 58 and digital phase detection is utilized. Such phase detectors and VCOs are commercially available and well known to those of skill in the art. One suitable phase detector design is a dual SR flip flop gate with two latched outputs, both of which are latched high at zero phase error. In this type of phase detector, one of the latched outputs pulses low with a duty cycle proportional to any lagging phase error between the input signals, while the other latched output pulses low with a duty cycle proportional to any leading phase error between the input signals. This type of phase detector is well known to those of skill in the art and is incorporated into many commercially available integrated circuits such as the types MM54HC4046 and MM74HC4046 CMOS phase-locked-loop integrated circuits from National Semiconductor. In these commercially available devices, the two output latches are fed to an output buffer which produces a single tri-state output at node 92 (corresponding to pin 15 of the dual in line package for the MM54HC4046 and MM74HC4046 mentioned above) from the two latched phase detector outputs. The nature of this tri-state output is described in more detail below with reference to FIG. 6. These integrated circuits include both a square wave VCO 84 output and an SR flip flop digital phase detector 86 which can maintain a zero degree phase difference at the phase detector 86 inputs. When this specific integrated circuit is used, the loop filter 94 and high-pass capacitor 90 are provided external to the IC. Specifically, the loop filter 94 is connected from pin 15 to pin 9 of the 4046 device, and the capacitor 90 is connected between the probe input at node 32 and pin 14 of the 4046 device. It will be appreciated by those of skill in the art that other types of phase detectors and VCO's may be used, including both analog or other digital types, and still remain within the spirit and scope of the invention disclosed herein.

This same phase detector circuit described with reference to FIG. 4 may alternatively be utilized separate from a VCO in a second preferred embodiment of the present invention illustrated in FIG. 5. Referring now to this Figure, it can be seen that rather than a VCO, a fixed frequency oscillator 100 provides a square wave output to node 58. This oscillator can take many forms well known to those in the art, for example, a crystal oscillator, ring oscillator, or in one preferred embodiment, a radio frequency sine wave generated by an analog oscillator which is input to a comparator for square wave generation.

The output of the oscillator 100 at node 58 provides a first input to a phase detector 86, which is again preferably of the dual SR flip flop type discussed above, while the voltage at node 32 across the probe 22 (again through high pass filter capacitor 90) provides a second input to the phase detector 86. It may be desirable to enhance the transition edges of the signal at node 32 by connecting a comparator (not shown in FIG. 5) to node 32 and driving the blocking capacitor 90 with its output, rather than driving the capacitor directly with the probe 22 input terminal. If this is done, it may be further desirable to include a delay line comprising, for example, a series of six inverters, between the oscillator 100 output at node 58 and the phase detector 86 input. Delay issues may alternatively be minimized with the use of different phase detector circuits. For example, a phase detector comprising a single SR flip flop with a pulse width modulated output may be utilized. In this design, the phase detector output has a 50% duty cycle when the inputs are 180 degrees out of phase. When this type of phase detector is used, an inverting comparator and buffer comparator are driven with the two input signals respectively, and their outputs are used as the two phase detector inputs. As it is easier to match characteristics of a pair of comparators rather than control the characteristics of a single one, differing delay characteristics of the circuits feeding the two inputs to the phase detector can be minimized.

It can be appreciated that a variety of different forms of phase detectors may be utilized with the present invention, many of which are described in standard textbooks on the subject such as the 2nd Edition of Phase Lock Techniques by Floyd M. Gardner.

The output of the phase detector 86 at node 92 is input to an integrating amplifier 102. Furthermore, the output of the integrating amplifier 102 is coupled to a varactor tuning diode 104 at node 106. As is known to those of skill in the art, the anode to cathode capacitance of a varactor diode 104 decreases with increasing reverse bias voltages. They are therefore useful in tuning resonant circuits as described in more detail below.

Referring again to FIG. 5, node 106 is further coupled to the input of the eddy current probe 22 at node 32 through an isolating capacitor 108. The input terminal to the probe 22 at node 32 may be also coupled to ground or common through optional external inductor 110 or capacitor 112 as desired to adjust the tuning range of the apparatus. When used, the inductor 110 or capacitor 112 is in parallel with the probe 22 and the series connected isolating capacitor 108 and varactor diode 104, forming an aggregate resonant circuit 114. It can be appreciated by examination of FIG. 6 that the oscillator 100 is driving not only the probe 22, but also the parallel inductor 110, capacitor 112, and series connected isolating capacitor 108 and varactor diode 104. To be driven at resonance, the oscillation frequency of the fixed frequency oscillator 100 must match the resonant frequency of the entire parallel circuit including both the probe 22 itself, and the additional components 110, 112, 108, 106 described above. It can further be appreciated that if the impedance of the probe 22 is shifting with probe to target distance, and if the oscillation frequency of the oscillator 100 is fixed, the only way to continuously drive the aggregate circuit 114 at resonance is to adjust the value of one or more components of the circuit 114 such that the resonant frequency of the circuit 114 continues to match the fixed oscillation frequency of the oscillator 100.

Figure 5:
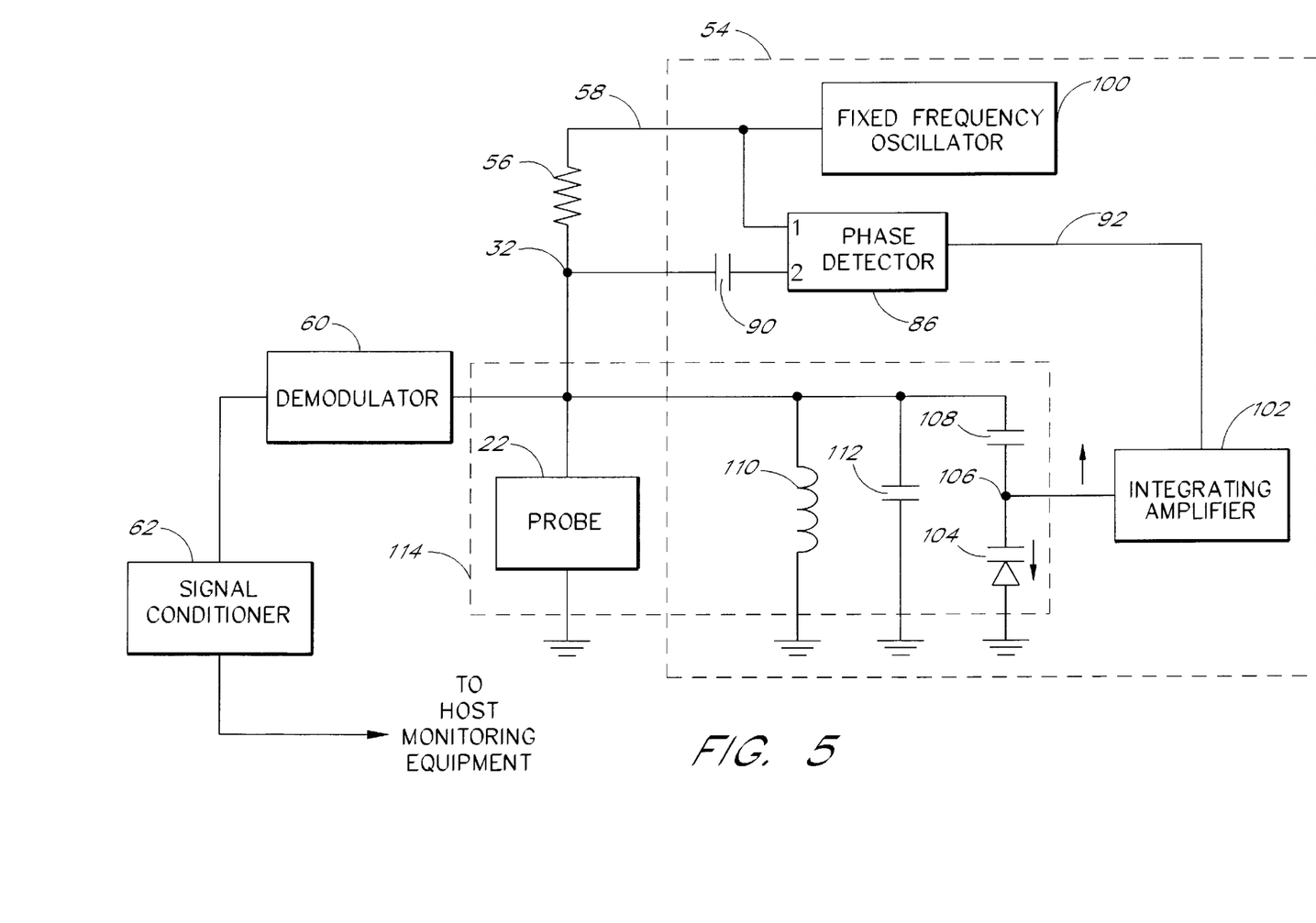
FIG. 5 is a schematic/block diagram of a second embodiment of a preferred eddy probe oscillator circuit of FIG. 2 according to the present invention.

This is accomplished in the circuit of FIG. 5 by controlling the capacitance of the varactor diode 104 with the phase detector 86 through the integrating amplifier 102. It is accordingly preferable for the varactor diode 104 to have a large dynamic range to accommodate and correct for large variations in probe impedance. Suitable varactor diodes are commercially available, such as the types MVAM109 and MV7005T1 from Motorola. These varactor diodes have a capacitance of approximately 500 pF at a reverse bias voltage of 1 V which decreases to about 40 pF at a reverse bias voltage of 9 V.

The output of the phase detector 86, having logic diagram as illustrated in FIG. 5, has three states. They are two low output impedance states, one having high potential and the other ground potential, and also a high output impedance off state. When the square wave signal at node 32 is low, the phase detector output at node 92 is latched high on the leading edge of the square wave output from the fixed oscillator 100 at node 58. When the square wave fixed oscillator output at node 58 is low, the phase detector output at node 92 is latched high on the leading edge of the square wave signal at node 32. In both cases, the output of the phase detector 86 at node 92 is switched to its off state by the leading edge of the signal which did not trigger the prior latch high or latch low. Accordingly, if the square wave voltage signal at node 32 is leading the oscillator 100 output voltage, a train of ground pulses will appear at the output of the phase detector 86 at node 92. Furthermore, if the square wave voltage signal at node 32 is lagging the oscillator 100 output voltage, a train of positive voltage pulses will appear at the output of the phase detector 86.

Figure 6:
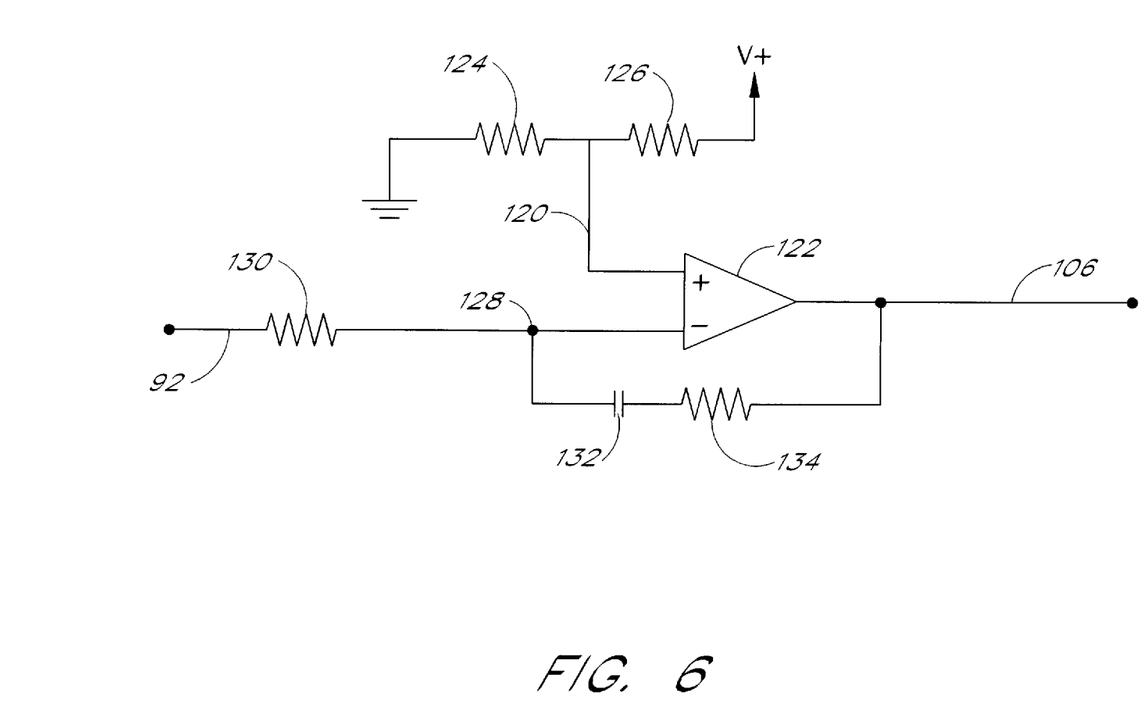
FIG. 6 is a schematic of a preferred filter and amplifier circuit for the oscillator of FIG. 6.

As described above, this phase detector output at node 92 is fed to an integrating amplifier 102. One preferred integrator 102 circuit is illustrated in FIG. 6. In this preferred circuit the positive input 120 of an operational amplifier 122 is held at a constant positive potential of about 2 to 3 Vdc by a resistive voltage divider comprised of two resistors 124, 126 which are tied between a positive reference potential (+10 Vdc being suitable) and ground. The output of the phase detector 86 at node 92 is coupled to the negative input 128 of the operational amplifier 122 through a resistor 130. The amplifier 122 is configured as an integrator by an RC feedback loop comprising a series connected capacitor 132 and resistor 134 connected between the amplifier negative input 128 and the amplifier output at node 106.

The circuit as a whole therefore functions as follows to maintain the resonant frequency of the circuit 114 substantially equal to the fixed oscillation frequency produced by the driving oscillator 100. In an initial state, the circuit 114 and probe to target distance are configured such that the resonant frequency of the circuit 114 matches the oscillation frequency of the oscillator 100. If then the resonant frequency of the circuit 114 shifts to be lower than the fixed oscillation frequency of the oscillator 100 by reason of a shift in probe target separation distance, the voltage at node 32 across the resonant circuit 114 will begin to lag the voltage from the oscillator 100 at node 58. If the leading edges of the signal at node 32 lag the leading edges of the signal at node 58, the phase detector 86 output at node 92 will be a train of negative pulses which will force the output of the integrating amplifier at node 106 to increase. This will decrease the capacitance of the varactor diode 104, thereby increasing the resonant frequency of the aggregate circuit 114 until the leading edges of the square waves at node 58 and node 32 are synchronized. In the synchronized state, the impedance of the aggregate circuit 114 is purely resistive, and the circuit 114 is being driven at its resonant frequency.

Similarly, if the resonant frequency of the circuit 114 shifts to be higher than the fixed oscillation frequency of the oscillator 100, the voltage at node 32 across the resonant circuit 114 will begin to lead the voltage from the oscillator 100 at node 58. If the leading edges of the signal at node 32 lead the leading edges of the signal at node 58, the phase detector 86 output at node 92 will be a train of positive pulses which will force the output of the integrating amplifier at node 106 to decrease. This will increase the capacitance of the varactor diode 104, thereby reducing the resonant frequency of the aggregate circuit 114 until the leading edges of the square waves at node 58 and node 32 are again synchronized.

In this way, the circuit 114 is always driven substantially at resonance by a fixed frequency oscillator 100. Although the circuit of FIG. 5 is slightly more complex than that described with respect to FIG. 4, fixed frequency drivers have some advantages over variable frequency drivers. For example, probe performance in the presence of temperature variations can be improved by driving the probe at a fixed frequency at which temperature effects are minimized. The optimum driving frequency in a fixed frequency system will vary with probe geometry and installation configuration. It can be preferable, therefore, to make the inductor 110 easily exchangeable, so that the driver circuit can be modified for different probes, cables, and installations to optimize performance.

Figure 7:
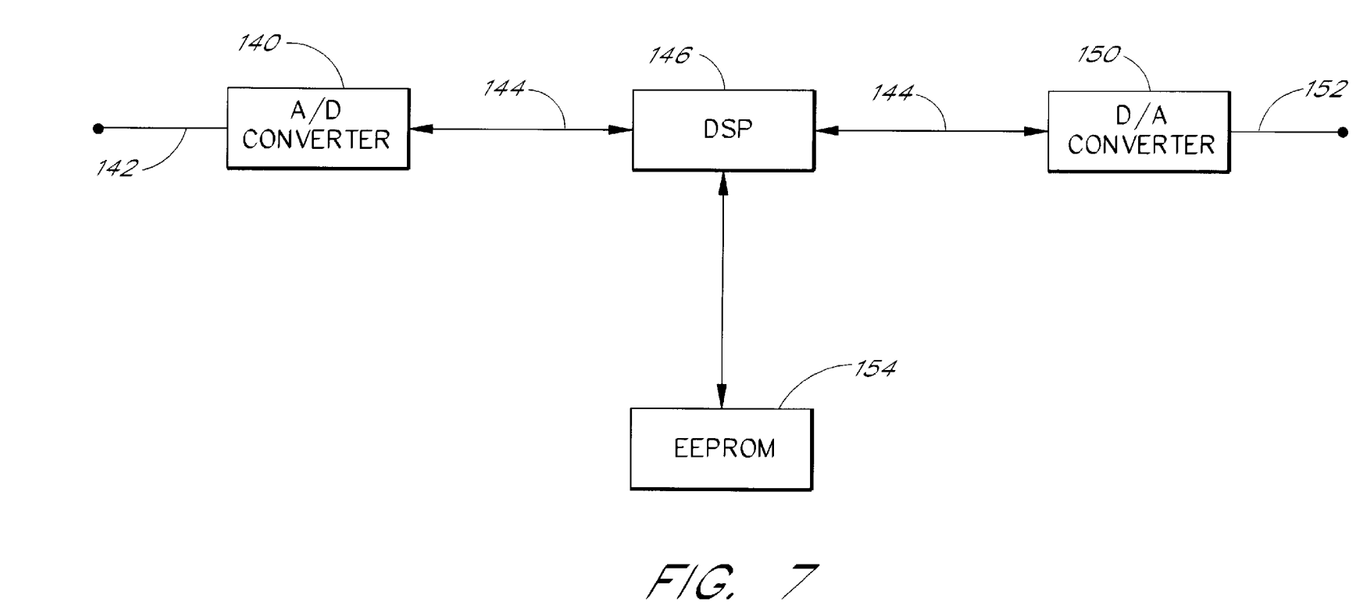
FIG. 7 is a block diagram of a preferred embodiment of a digital linearization and processing circuit of FIG. 2 according to the present invention.

FIG. 7 is a block diagram of an embodiment of a preferred signal conditioner 62 illustrated in FIGS. 2, 4, and 5. Preferably, the signal conditioner 62 linearizes the demodulated signal from node 32 such that the output of the signal conditioner to host monitoring equipment is a signal which varies linearly with probe to target separation distance.

Referring now to FIG. 7, an analog to digital converter 140 receives the output from the demodulator circuit 60 at node 61 and converts the analog output signal to a corresponding series of digital samples. Analog-to-digital (and digital-to-analog) converters are in widespread use and suitable commercial embodiments are well known to those of ordinary skill in the art. For example, the TLC320AC02 from Texas Instruments has been found suitable for this circuit.

The digital samples output from converter 140 are input to a digital signal processor (DSP) 146 via a standard SSI interface 144. The DSP 146 converts each digital sample into a second digital value based on either a lookup table, arithmetic algorithm, or a combination of both as described in more detail below. These converted values are output via the SSI interface 144 to a digital to analog converter 150 (which may also be a Texas Instruments TLC320AC02) which outputs a conditioned analog signal at node 63 to host monitoring equipment. There is, of course, a trade off between A/D conversion resolution and cost. It has been found suitable to use 14 bit sampling resolution and processing, although a resolution as low as 10 bits is acceptable for many applications. Many suitable digital signal processors are well known and commercially available. In one embodiment of the present invention, the type TMS320C203 from Texas Instruments has been found preferable.

As mentioned above, the output signal at node 63 preferably has a different functional relationship to probe to target separation than that of the input signal from the demodulator at node 61. Most preferably, the output signal at node 63 is substantially linear with probe to target separation distance. This conversion to a linear dependence on probe-target separation can be implemented in the DSP 146 in a variety of ways.

As one option, an entire calibration curve representing input signal amplitude as a function of probe-target separation could be modeled as a single mathematical function. An output value could then be computed for each input value by calculating a displacement from the input sample using the model mathematical function, and then calculating an appropriate output value using the linear function desired for the output. Although straightforward, this method requires complex computation which is time consuming and relatively expensive to implement.

In another embodiment, a correlation table may be stored in an EEPROM 154, which interfaces with the DSP 146. At run time, the table or a portion of the table stored in the EEPROM 154 may be downloaded into the internal RAM of the DSP 146. In one embodiment, each table entry stored in the EEPROM 154 is a corrected output value corresponding to one of the possible sampled digital values which may be output by the analog to digital converter 140. In this system, the table is stored in the DSP 146 RAM memory at addresses corresponding to possible analog to digital converter 140 outputs. Each digital value output by the analog to digital converter 140 is then used as a DSP 146 memory address at which is stored the corrected digital value to be output from the DSP 146 to the digital to analog converter 150.

Figure 8:
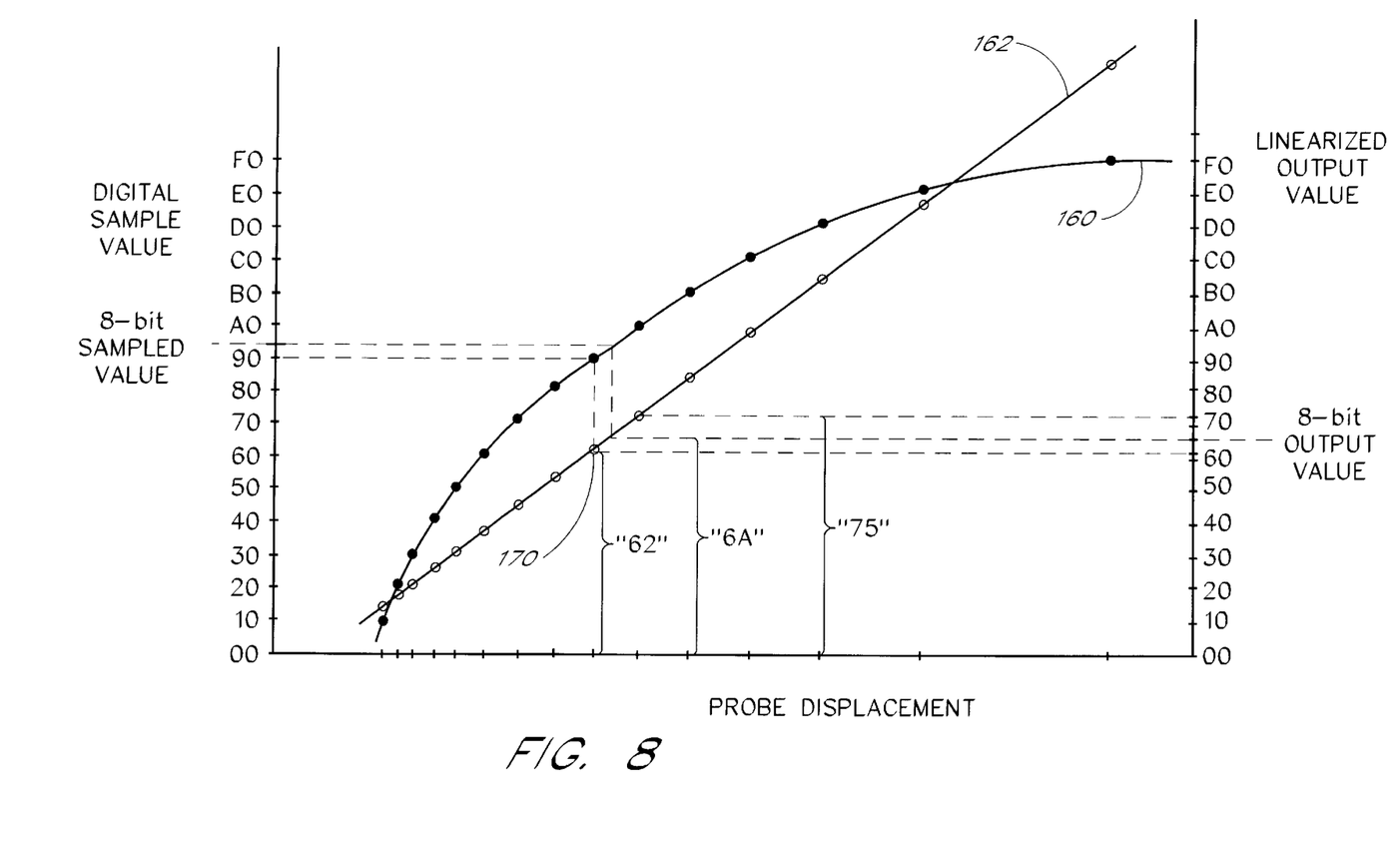
FIG. 8 is a graph of both non-linear probe output and substantially linear signal conditioner output as function of probe-target separation.

Alternative linearization algorithms may also be employed. In one preferred embodiment, a 16-bit analog to digital converter 140 is employed, with the first eight bits of each sampled value being used as an index to a table containing a base output value and calibration coefficients associated with an interpolation transfer function. A simple eight bit (rather than 16 bit) version of this scheme is illustrated in FIG. 8. As illustrated in this Figure, each probe and cable configuration has a particular non-linear functional relationship 160 between signal output amplitude and probe-target separation distance. As discussed above, however, it is preferable for the output of the signal conditioner 62 to be a linear function 162 of probe-target separation distance. In the simplified eight bit scheme illustrated in FIG. 8, an example digital sample value is presented as "98". The four most significant bits of this value are "1001", or decimal 9. These first four bits access an eight bit table entry 170 of "62" on the desired linearized output curve 162. The four least significant bits of the digital input sample are then used to access calibration coefficients for arithmetically interpolating between adjacent table entries "62" and "75", thereby producing the final output value of "6A". Preferably, the transfer function utilized to interpolate the final output value from the least significant input bits varies depending upon the value of the most significant bits of the sampled data. The transfer function may comprise a polynomial having coefficients which are different for each possible value of the most significant sampled bits. In this way, piecewise linearization may be performed on the non-linear series of digital inputs. Each probe geometry will be associated with a set of base output values accessed by the four most significant bits of the sampled value, as well as a set of calibration coefficients for interpolation between these base output vales. These parameters may be determined experimentally using measurements of signal amplitude and probe displacements, and are stored in the EEPROM 154 for use by the DSP 146 during operation.

It will be appreciated by those of skill in the art that other digital linearization algorithms may be employed. For example, rather than forming a correlation table based on equally spaced input samples as illustrated in FIG. 8, a correlation based on equally spaced probe-target separation distances may be employed. This method requires the use of a more computationally intensive binary search and divide function, yet has the advantage of having a higher data table density at large target displacement values (resulting from the smaller change in voltage for a given change in position at the greater displacement). Hence, the resolution at higher target displacements may be increased with this algorithm. It may also be desirable to combine the two algorithms in a piece-wise manner such that the advantages of each are employed for varying portions of the signal vs. displacement curve 160. For example, the displacement-indexed scheme may be employed for that portion of the curve relating to high values of target displacement (due to its enhanced resolution in this region), while the voltage-indexed algorithm may be used for lesser displacement values. As yet another alternative, a multiplying D/A converter, (commonly known as an MDAC) could be utilized to perform linearization partially in the analog domain and partially in the digital domain. As is well known, an MDAC is a digitally controlled variable gain analog amplifier. In an embodiment of this type, the analog output from the demodulator is fed to the MDAC and an A/D converter. The A/D converter addresses a look up table in a memory such as an EEPROM, which then outputs the chosen digital word to control the MDAC gain.

The foregoing description details certain preferred embodiments of the present invention and describes the best mode contemplated. It will be appreciated, however, that no matter how detailed the foregoing appears in text, the invention can be practiced in many ways and the invention should be construed in accordance with the appended claims and any equivalents thereof.

What is claimed is:

1. An apparatus for determining the position of a conductive target, comprising:

an eddy current probe, wherein said eddy current probe comprises an inductor mounted near said conductive target;

an oscillator connected to said inductor;

a demodulator having an output comprising the peak voltage across said inductor wherein said peak voltage has a first functional dependence on the position of said conductive target;

an analog to digital converter digitizing said demodulator output to produce a first set of digital data;

a signal processor performing arithmetic operations on said first set of digital data to produce a second set of digital data; and a digital to analog converter having as an input said second set of digital data and as an output an analog signal which has a second functional dependence on the position of said conductive target, wherein said second functional dependence is substantially linear.

2. The apparatus of claim 1, wherein said oscillator comprises a phase locked loop.

3. The apparatus of claim 1, wherein said oscillator comprises a variable frequency oscillator having an output coupled to an input of said eddy current probe, said apparatus further comprising:

a phase detector circuit having a first input coupled to said input of said eddy current probe, a second input coupled to said output of said variable frequency oscillator, and an output coupled to said variable frequency oscillator;

wherein the oscillation frequency of said variable frequency oscillator is varied in response to an output of said phase detector.

4. The apparatus of claim 3, wherein said input of said eddy current probe is coupled to said first input of said phase detector circuit through a capacitor.

5. The apparatus of claim 3, wherein said output of said variable frequency oscillator is coupled to said input of said eddy current probe through a resistor.

6. The monitoring apparatus of claim 3, wherein said variable frequency oscillator outputs a square wave signal.

7. The monitoring apparatus of claim 6, wherein said phase detector has an output signal dependent upon the phase difference between the output of said variable frequency oscillator and the voltage across said eddy current probe.

8. The apparatus of claim 7, wherein said phase detector comprises a plurality of cross coupled NOR gates.

9. The apparatus of claim 1, wherein said oscillator comprises a fixed frequency oscillator having an output coupled to an input of said eddy current probe, said apparatus further comprising:

a variable capacitor;

a phase detector circuit having a first input coupled to said input of said eddy current probe, a second input coupled to said output of said fixed frequency oscillator, and an output coupled to said variable capacitor;

wherein the capacitance of said variable capacitor is varied in response to an output of said phase detector.

10. The apparatus of claim 9, wherein said input of said eddy current probe is coupled to said first input of said phase detector circuit through a capacitor.

11. The apparatus of claim 9, wherein said output of said fixed frequency oscillator is coupled to said input of said eddy current probe through a resistor.

12. The apparatus of claim 9, wherein said variable capacitor comprises a reverse biased varactor diode.

13. The apparatus of claim 12, wherein said output of said phase detector is coupled to said varactor diode through an integrator circuit.

14. The apparatus of claim 9, wherein said variable frequency oscillator outputs a square wave signal.

15. The apparatus of claim 14, wherein said phase detector has an output signal dependent upon the phase difference between the output of said variable frequency oscillator and the voltage across said eddy current probe.

16. The apparatus of claim 15, wherein said phase detector comprises a plurality of cross coupled NOR gates.

17. The apparatus of claim 16, wherein said output of said phase detector is coupled to said varactor diode through an integrator circuit.

18. The apparatus of claim 1, wherein said signal processor comprises a memory storing a table correlating at least one member of said first set of digital data to at least one member of said second set of digital data.

19. The apparatus of claim 1, wherein said signal processor comprises a multiplying digital to analog converter.

20. The apparatus of claim 19, additionally comprising a memory storing information for controlling a gain of said multiplying digital to analog converter.

* * * * *